Patented June 19, 1923.

1,459,084

UNITED STATES PATENT OFFICE.

OSBORNE BEZANSON, OF WOBURN, MASSACHUSETTS, ASSIGNOR TO MERRIMAC CHEMICAL COMPANY, OF WOBURN, MASSACHUSETTS, A CORPORATION OF MASSACHUSETTS.

PROCESS OF TREATING ACID SLUDGE.

No Drawing. Application filed May 14, 1921. Serial No. 469,814.

*To all whom it may concern:*

Be it known that I, OSBORNE BEZANSON, a citizen of the United States, residing at Woburn, in the county of Middlesex and State of Massachusetts, have invented certain new and useful Improvements in Processes of Treating Acid Sludge, of which the following is a specification.

This invention is a novel process for the utilization of the so-called acid sludge (or spent acid) derived as a by-product from the refining of various petroleum fractions, such as gasoline, kerosene or the like, with sulfuric acid or fuming acid of any concentration or sulfuric anhydrid. The composition of the acid sludge resulting from such treatment of petroleum products necessarily varies over rather wide limits according to the nature of the petroleum and the particular methods of refining the same: it consists essentially, however, of free sulfuric acid of varying strength, sulfuric acid chemically combined with tarry and other organic matters, and such oily residues as are physically retained by the acid sludge.

The disposal of this acid sludge and the most economical utilization of the same have been a subject of investigation for many years. Certain processes heretofore developed have not proven economical in practice because of the large amount of fuel required in the operation. Another objectionable feature common to many of the proposed processes is the unavoidable pollution of the atmosphere by the extremely obnoxious odors which are liberated during the treatment of the sludge. Advantages characteristic of the present process are that very little or no auxiliary fuel is consumed, and no objectionable odors are emitted at any point.

I have found that if acid sludge from the refining of petroleum is sprayed or atomized or otherwise injected in subdivided state into a suitable combustion chamber maintained at red heat or above (say from 500° C. upwards but preferably around 700° C. or higher), complete decomposition occurs, and the sulfuric acid and other sulfur compounds may be substantially completely converted into sulfur dioxid. This gas may be advantageously collected, or used in the manufacture of sulfuric acid or for any other purposes for which sulfur dioxid may be employed. The carbonaceous matter contained in the acid sludge, including hydrocarbons and hydrocarbon derivatives, etc., is completely or nearly completely oxidized at the expense of the combined oxygen in the sludge, and by air or oxygen admitted to the combustion chamber through the burner or otherwise. Sufficient heat is thereby produced to effect the decomposition of the existing sulfur compounds with formation of sulfur dioxid.

My process may be carried out either:

1. By spraying the acid sludge into a burner or furnace chamber of any of the well known types used for the combustion of sulfur, pyrites or other sulfur-bearing materials, the sludge being either sprayed directly upon or above the burning sulfur or into the combustion chamber of the furnace, or 2. By providing an independent combustion chamber equipped with an oil burner or other suitable means for raising the chamber to red heat or above.

In the practice of the invention according to the second of the above mentioned embodiments, I have found that it is not necessary as a rule to employ auxiliary heat except for the purpose of bringing the combustion chamber up to the desired temperature, since the combustion of the carbonaceous matter is contained in the acid sludge which is sprayed or atomized into the chamber develops therein sufficient heat to easily maintain the temperature necessary for the complete decomposition of the acid sludge.

I claim:—

1. Process of treating acid sludge from the refining of petroleum, comprising injecting or spraying the same in subdivided state together with the necessary air into a chamber maintained at a sufficient temperature to effect substantially complete decomposition of the sludge with liberation of its sulfur content as sulfur dioxid.

2. Process according to claim 1 in which the acid sludge is injected or sprayed into a burner in which pyrites, sulfur or other sulfur bearing materials may be combusted.

3. Process of treating acid sludge from the refining of petroleum, comprising injecting the same with the necessary air into a chamber maintained at a temperature of at least red heat whereby odoriferous organic material in the sludge is destroyed and sulfur dioxid is produced, the heat necessary for maintaining said combustion chamber at said temperature being derived from the combustion of the sludge.

4. Process of treating acid sludge from the refining of petroleum which comprises injecting the same with the necessary air into a chamber in which pyrite, sulfur or other sulfur bearing material is being burned, said chamber maintained at a sufficient temperature to effect substantially complete decomposition of the sludge, whereby sulfur dioxid containing gas suitable for use in the manufacture of sulfuric acid is produced.

In testimony whereof, I affix my signature.

OSBORNE BEZANSON.